(12) United States Patent
Young

(10) Patent No.: US 7,722,054 B2
(45) Date of Patent: May 25, 2010

(54) CHUCK WITH TORQUE INDICATOR

(75) Inventor: Gary L. Young, Six Mile, SC (US)

(73) Assignee: Jacobs Chuck Manufacturing Company, Clemson, SC (US)

( * ) Notice: Subject to any disclaimer, the term of this patent is extended or adjusted under 35 U.S.C. 154(b) by 0 days.

(21) Appl. No.: 12/272,417

(22) Filed: Nov. 17, 2008

(65) Prior Publication Data

US 2009/0072501 A1     Mar. 19, 2009

Related U.S. Application Data

(63) Continuation of application No. 10/834,403, filed on Apr. 29, 2004, now Pat. No. 7,451,990.

(51) Int. Cl.
    *B23B 31/16*     (2006.01)
(52) U.S. Cl. ................ 279/62; 279/140; 279/902
(58) Field of Classification Search ............. 279/60–62, 279/140, 902; *B23B 31/16*
See application file for complete search history.

(56) References Cited

U.S. PATENT DOCUMENTS

| 573,189 | A | 12/1896 | Vogel |
|---|---|---|---|
| 4,395,170 | A | 7/1983 | Clarey |
| 4,498,682 | A | 2/1985 | Glore |
| 5,044,643 | A | 9/1991 | Nakamura |
| 5,125,673 | A | 6/1992 | Huff et al. |
| 5,145,192 | A | 9/1992 | Rohm |
| 5,145,193 | A | 9/1992 | Rohm |
| 5,172,923 | A | 12/1992 | Nakamura |
| 5,232,230 | A | 8/1993 | Lin |
| 5,234,223 | A | 8/1993 | Sakamaki |
| 5,253,879 | A | 10/1993 | Huff et al. |
| 5,286,041 | A | 2/1994 | Rohm |
| 5,348,317 | A | 9/1994 | Steadings et al. |
| 5,431,419 | A | 7/1995 | Mack |
| 5,458,345 | A | 10/1995 | Amyot |
| 5,499,829 | A | 3/1996 | Rohm |
| 5,499,830 | A | 3/1996 | Schnizler |
| 5,501,473 | A | 3/1996 | Barton et al. |
| 5,553,873 | A * | 9/1996 | Salpaka et al. ............ 279/62 |
| 5,580,197 | A | 12/1996 | Rohm |
| 5,590,985 | A | 1/1997 | Mack |

(Continued)

FOREIGN PATENT DOCUMENTS

DE      4238503 C1      11/1993

(Continued)

*Primary Examiner*—Eric A Gates
(74) *Attorney, Agent, or Firm*—Nelson Mullins Riley & Scarborough, LLP

(57) ABSTRACT

A chuck for a driver having a rotatable drive shaft, the chuck having a cylindrical body member having a nose section and a tail section. A plurality of jaws is slidably positioned in the body, and each jaw has a jaw face and threads. A nut is rotatably mounted on the body in engagement with the jaw threads. A nut retainer member includes a first portion fixed to the body and a second portion engaging the nut. The chuck includes a plurality of recesses and a deflectable pawl biased toward and engaging the plurality of recesses. In a first state, one of the deflectable pawl and the plurality of recesses travels with the body and the other with the nut, and in a second state they travel together.

20 Claims, 9 Drawing Sheets

U.S. PATENT DOCUMENTS

| | | |
|---|---|---|
| 5,615,899 A | 4/1997 | Sakamaki |
| 5,624,125 A | 4/1997 | Rohm |
| 5,741,016 A | 4/1998 | Barton et al. |
| 5,765,839 A | 6/1998 | Rohm |
| 5,816,582 A | 10/1998 | Steadings et al. |
| 5,816,583 A | 10/1998 | Middleton |
| 5,829,761 A | 11/1998 | Rohm |
| 5,957,469 A | 9/1999 | Miles et al. |
| 5,988,958 A | 11/1999 | Mack |
| 6,070,884 A | 6/2000 | Mack |
| 6,095,530 A | 8/2000 | Rohm |
| 6,129,363 A | 10/2000 | Mack |
| 6,260,856 B1 | 7/2001 | Temple-Wilson |
| 6,341,783 B1 | 1/2002 | Rohm |
| 6,390,481 B1 | 5/2002 | Nakamuro |
| 6,550,785 B2 | 4/2003 | Rohm |
| 6,572,310 B2 | 6/2003 | Temple-Wilson |
| 6,575,478 B2 | 6/2003 | Rohm et al. |
| 6,581,942 B2 | 6/2003 | Rohm |
| 6,688,610 B2 * | 2/2004 | Huggins et al. ............... 279/22 |
| 6,848,691 B2 | 2/2005 | Yang et al. |
| 6,860,488 B2 | 3/2005 | Mack |
| 6,991,238 B2 | 1/2006 | Yang et al. |
| 7,125,021 B2 * | 10/2006 | Tan ............................. 279/62 |
| 7,128,324 B2 | 10/2006 | Yang et al. |
| 7,249,770 B2 | 7/2007 | Yang et al. |
| 2005/0023776 A1 * | 2/2005 | Yang et al. .................... 279/62 |
| 2005/0087937 A1 | 4/2005 | Zhou |

FOREIGN PATENT DOCUMENTS

| | | |
|---|---|---|
| DE | 19506708 C1 | 3/1996 |
| DE | 29600727 U1 | 4/1996 |
| DE | 4438991 A1 | 5/1996 |
| DE | 10111750 A1 | 11/2001 |
| EP | 0677348 A1 | 10/1995 |
| EP | 0710520 A2 | 5/1996 |
| EP | 1055472 A1 | 11/2000 |
| EP | 1224993 A2 | 7/2002 |
| FR | 2645056 A1 | 10/1990 |
| JP | 4365504 | 12/1992 |
| JP | 2000-326116 | 11/2000 |
| JP | 2002-254222 | 9/2002 |

* cited by examiner

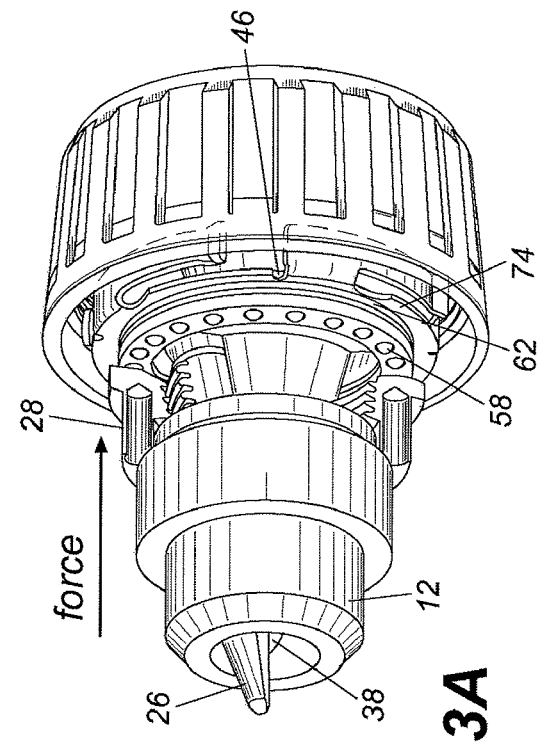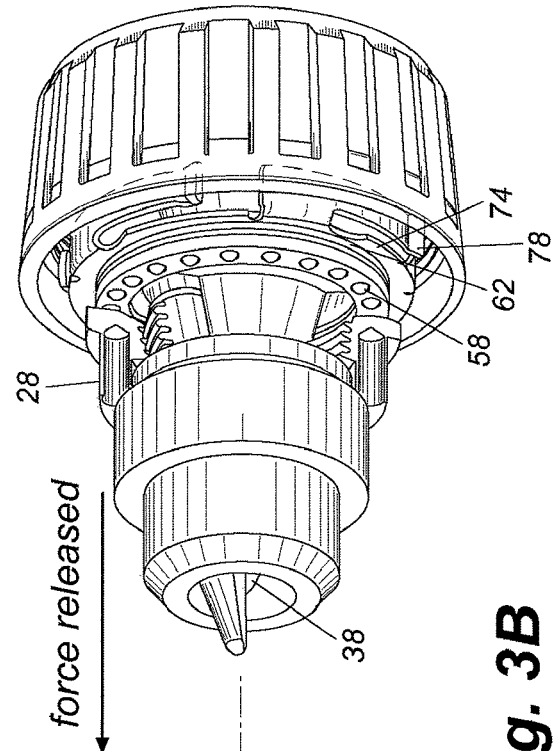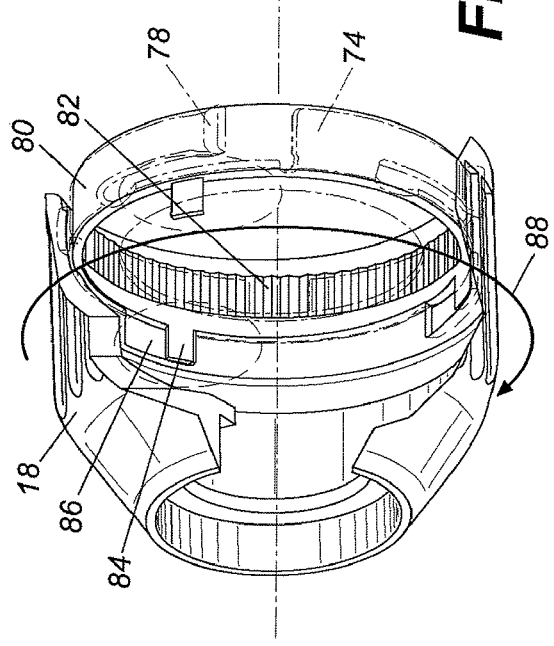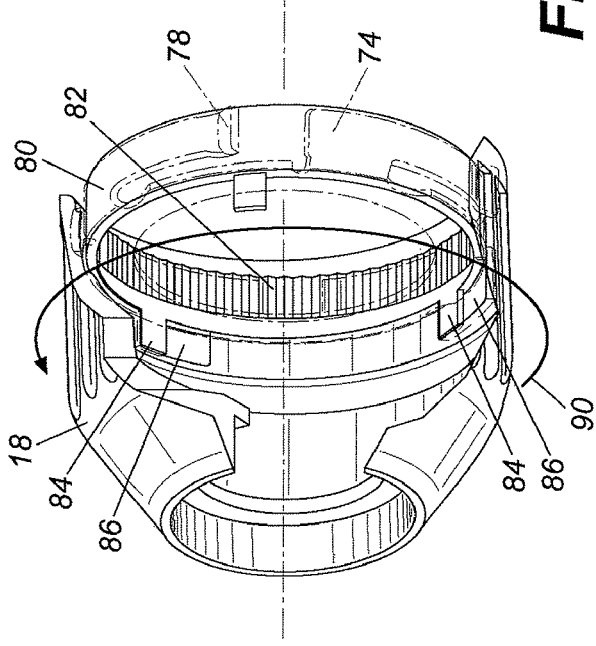
Fig. 3A
Fig. 3B

CHUCK WITH TORQUE INDICATOR

CLAIM OF PRIORITY

This application is a continuation of U.S. patent application Ser. No. 10/834,403, filed Apr. 29, 2004, the entire disclosure of which is incorporated by reference herein.

FIELD OF THE INVENTION

The present invention relates generally to chucks for use with drills or with electric or pneumatic power drivers. More particularly, the present invention relates to a chuck of the keyless type which may be tightened or loosened by hand or actuation of the driver motor.

BACKGROUND OF THE INVENTION

Hand, electric and pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120 degrees apart from each other. The passageways are configured so that their center lines meet at a point along the chuck axis forward of the chuck. The passageways constrain three jaws that are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached to the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Various configurations of keyless chucks are known in the art and are desirable for a variety of applications.

SUMMARY OF THE INVENTION

The present invention recognizes and addresses considerations of prior art constructions and methods. In one embodiment of the present invention, a chuck has a generally cylindrical body having a nose section and a tail section, the tail section being configured to rotate with the drive shaft of the driver and the nose section has an axial bore formed therein. A plurality of jaws are movably disposed with respect to the body and are in communication with the axial bore. A nut is rotatably mounted about the body and is in operative communication with the jaws so that rotation of the nut in a closing direction moves the jaws toward the axis of the axial bore and rotation of the nut in an opening direction moves the jaws away from the axis. A generally cylindrical first sleeve is rotatably mounted about the body and is in driving engagement with the nut. The chuck also includes a tightening indicator having a first ring received intermediate the nut and the body and a second ring that rotates relative to the first sleeve over a limited arc. Additionally, one of the first ring and the second ring defines a ratchet and the other of the first ring and the second ring defines at least one deflectable pawl biased toward the ratchet. Moreover, the first ring is rotationally coupled to the second ring in the closing direction until the jaws clamp onto a tool shank; thereinafter, the first ring is rotationally fixed to the chuck body so that the second ring is rotatable relative to the first ring in the closing direction.

In another embodiment, a chuck has a generally cylindrical body having a nose section and a tail section, the tail section being configured to rotate with the drive shaft of the driver and the nose section having an axial bore formed therein. A plurality of jaws is movably disposed with respect to the body in communication with the axial bore. A nut is rotatably mounted about the body and in operative communication with the jaws so that rotation of the nut in a closing direction moves the jaws toward the axis of the axial bore and rotation of the nut in an opening direction moves the jaws away from the axis. A generally cylindrical sleeve is rotatably mounted about the body and in driving engagement with the nut. The chuck also has a tightening torque indicator having a plurality of equally spaced recesses that travel with one of the nut and the body and at least one deflectable pawl that travel with the other of the nut and the body. The at least one deflectable pawl is biased toward and received in one of the plurality of equally spaced recesses. Movement of the at least one deflectable pawl from the one of the plurality of equally spaced recesses to an adjacent one of the plurality of equally spaced recesses corresponds to a predetermined input torque on the nut that results in a predetermined output gripping force between the plurality of jaws.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which:

FIG. 3A is a partially exploded perspective view of the chuck shown in FIG. 1 with the sleeve and nut shown in a clamped position;

FIG. 3B is a partially exploded perspective view of the chuck shown in FIG. 1 with the sleeve and nut shown in a released position;

Figure 1:
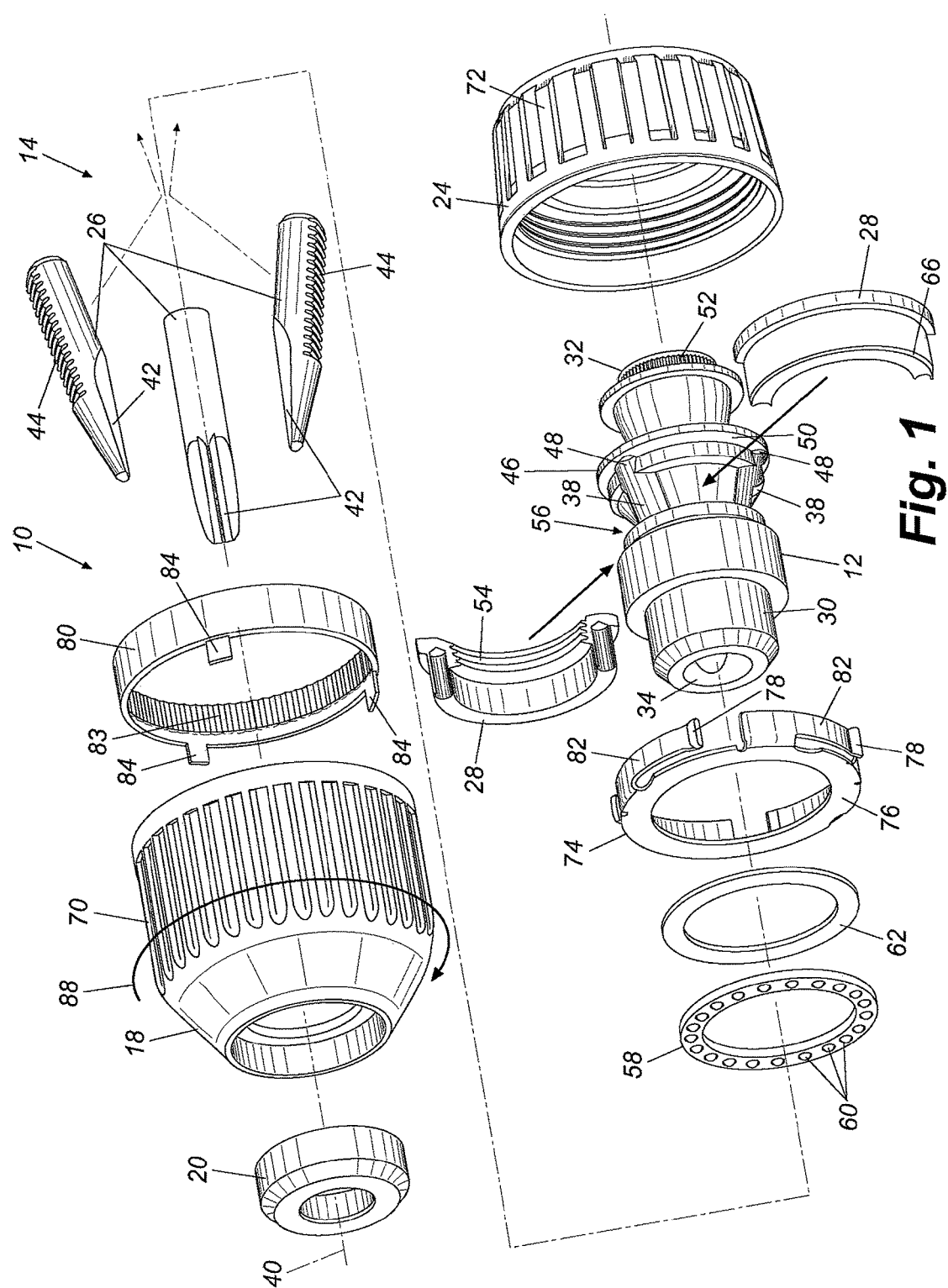
FIG. 1 is an exploded view of a chuck in accordance with an embodiment of the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
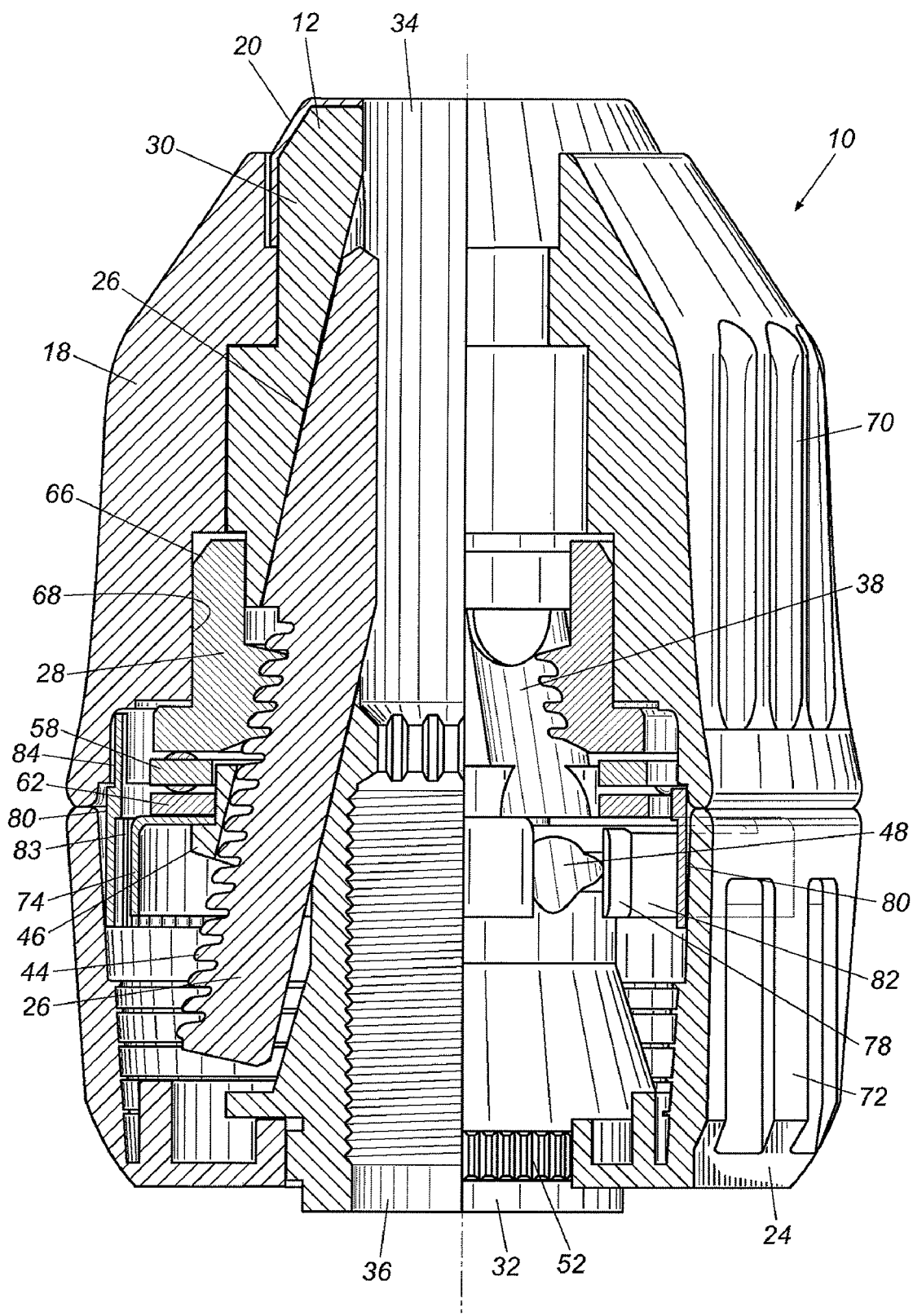
FIG. 2 is a longitudinal view, in cross section, of the chuck shown in FIG. 1.

Referring to FIGS. 1 and 2, a chuck 10 in accordance with the present invention includes a body 12, a gripping mechanism, generally 14, a front sleeve 18, a nose piece 20, a rear sleeve 24 and a nut 28. In the embodiment illustrated, gripping mechanism 14 includes a plurality of jaws 26. Body 12 is generally cylindrical in shape and comprises a nose or forward section 30 and a tail or rearward section 32. An axial bore 34 formed in forward section 30 is dimensioned somewhat larger than the largest tool shank that chuck 10 is designed to accommodate. A threaded bore 36 (FIG. 2) is formed in tail section 32 and is of a standard size to mate with a drive shaft of a powered or hand driver, for example a power drill having a spindle. The bores 34 and 36 may communicate at a central region of body 12. While a threaded bore 36 is illustrated, such bore is interchangable with a tapered bore of a standard size to mate with a tapered drive shaft. Furthermore, body 12 may be formed integrally with the drive shaft.

Body 12 defines three passageways 38 that accommodate jaws 26. Each jaw is separated from each adjacent jaw by an arc of approximately 120 degrees. The axis of passageways 38 and jaws 26 are angled with respect to the chuck center axis 40 such that each passageway axis travels through axial bore 34 and intersects axis 40 at a common point. Each jaw 26 has a tool engaging face 42 generally parallel to chuck axis 40 and threads 44 formed on the jaw's opposite or outer surface that may be constructed in any suitable type and pitch. Body 12 includes a thrust ring member 46 which, in a preferred embodiment, may be integral with body 12. In an alternate embodiment, thrust ring member 46 may be a separate component from body 12 that is axially and rotationally fixed to the chuck body by interlocking tabs, press fitting or other suitable connection means. Thrust ring member 46 includes a plurality of jaw guideways 48 formed around its circumference to permit retraction of jaws 26 therethrough and also includes a ledge portion 50 to receive a bearing assembly as described below.

Body tail section 32 includes a knurled surface 52 that receives rear sleeve 24 in a press fit fashion. Rear sleeve 24 could also be retained through a press fit without knurling, by use of a key or by crimping, staking, riveting, threading or any other suitable method of securing the sleeve to the body. Further, the chuck may be constructed with a single sleeve having no rear sleeve, for example where the power driver to which the chuck is attached includes a spindle lock feature to enable actuation of the chuck by the single sleeve when the spindle is rotationally fixed by the spindle lock.

Nut 28, which in the preferred embodiment is a split nut, defines female threads 54 located on an inner circumference of the nut and is received in a groove 56 formed in chuck body 12 proximate thrust ring member 46. A bearing washer 62 and an annular bearing cage 58 are received between thrust ring 46 and nut 28. Bearing cage 58 holds a plurality of balls 60 that permits the nut to rotate relative to the chuck body.

Nut 28 is shown in FIG. 1 without serrations or knurling on its outer circumference. However, it should be understood that nut 28 may be formed with axially-aligned teeth, or other forms of knurling, on its outer circumference, and its outer edges may be provided with a small chamfer 66 to facilitate press fitting of the nut into a bore 68 of front sleeve 18. Preferably, the front sleeve is molded or otherwise fabricated from a structural plastic such as a polycarbonate, a filled polypropylene, e.g., glass-filled polypropylene, or a blend of structural plastic materials. Other composite materials such as graphite filled polymerics may also be suitable in certain environments. As should be appreciated by one skilled in the art, the materials from which the chuck of the present invention are fabricated will depend on the end use of the chuck, and the above materials are provided by way of example only.

The outer circumferential surface of front sleeve 18 may be knurled or may be provided with longitudinal ribs 70 or other protrusions to enable the operator to grip it securely. In like manner, the circumferential surface of rear sleeve 24 may be knurled or ribbed as at 72 if desired. Front sleeve 18 is press fit to nut 28 to rotationally and axially secure the sleeve to the nut. The press fitting of nose piece 20 to body nose section 30 also helps to retain sleeve 18 against forward axial movement. Nose piece 20 may be coated with a non-ferrous metallic coating to prevent rust and to enhance its appearance. Examples of suitable coatings include zinc or nickel, although it should be appreciated that any suitable coating could be utilized.

Because sleeve 18 is rotationally fixed to nut 28, the sleeve's rotation with respect to body 12 also rotates nut 28 with respect to the body, which moves jaws 26 axially within passageways 38 due to the engagement of jaw threads 44 and nut threads 54. The direction of axial movement of jaws 26 depends on the rotational direction of sleeve 18 and nut 28 with respect to body 12. If a tool, such as a drill bit, is inserted into bore 34, the sleeve and nut may be rotated about chuck axis 40 in a closing direction 88 (FIG. 3A) so that jaws 26 move to a closed position wherein jaw tool engaging surfaces 42 grippingly engage the tool. Rotation of sleeve 18 and nut 28 about axis 40 in the opposite or opening direction 90 (FIG. 3B) moves the jaws axially rearward out of the closed position to an open position as illustrated in FIG. 2.

Chuck 10 includes a tightening torque indicator comprising an annular ring 74 and an annular ratchet 80. Annular ring 74 defines an inwardly extending flange 76 and has pawls 78 that are connected to the ring via spring tabs 82. Spring tabs 82 bias the pawls radially outward from chuck axis 40 into engagement with annular ratchet 80. Annular ratchet 80 defines forwardly extending tabs 84 and a plurality of teeth 83 formed on an inner circumference of the main ratchet band. Each of teeth 83 has a first side with a slope approaching 90 degrees and a second side having a lesser slope, which allows pawls 78 to slip over the teeth in one direction but not in the opposite direction.

Annular ring 74 is received on chuck body 12 intermediate bearing washer 62 and thrust ring 46. Annular ratchet 80 is received about annular ring 74 and nut 28 so that grooves 86 (FIGS. 3A and 3B) formed on the inner circumference of sleeve 18 receive respective tabs 84. The width of grooves 86 is larger than the width of tabs 84 so that sleeve 18 is rotatable over a limited angular distance relative to annular ratchet 80.

To close the chuck from an open condition, and referring to FIG. 3A, nut 28 is rotated via sleeve 18 in closing direction 88 so that jaws 26 are threadedly moved axially forward within passageways 38. Because tabs 84 sit against the driving edges of grooves 86, annular ratchet 80 rotates in conjunction with sleeve 18. Annular ring 74 also rotates with sleeve 18 since pawls 78 rotationally fix annular ring 74 to annular ratchet 80. Once jaws 26 clamp onto a tool shank, however, a corresponding axial force is increasingly exerted rearwardly through jaws 26 to nut 28. The rearward axial force is transmitted through nut 28 to chuck body 12, and in particular against thrust ring member 46. Because annular ring flange 76 is intermediate bearing washer 62 and thrust ring ledge 50, axial force is transmitted from nut 28 through annular ring flange 76 to thrust ring member 46. This increases frictional forces between annular ring flange 76, bearing washer 62 and thrust ring member 46 in a direction opposite to the direction that sleeve 18 and nut 28 are being rotated. Accordingly, the frictional forces restrain rotation of annular ring 74 with respect to body member 12. Bearing 58, however, permits sleeve 18 and nut 28 to continue to rotate relative to chuck body 12 and annular ring 74 in the closing direction. Additionally, since pawls 78 are deflectable and are generally disposed in alignment with the shallow slopes of the second side of teeth 83, annular ratchet 80 continues to rotate with sleeve 18 relative to annular ring 74. Thus, as annular ratchet 80 rotates, the distal ends of pawls 78 repeatedly ride over teeth 83, producing an audible clicking sound as the pawl ends fall against each subsequent tooth's second side. Pawls 78 are generally perpendicular to the first sides of teeth 83 and do not deflect inward to permit rotation of annular ratchet 80 in a direction opposite to 88. That is, until the jaws clamp onto a tool shank, annular ring 74 rotates with annular ratchet 80. Once the jaws clamp onto a tool shank, annular ratchet 80 rotates in the closing direction relative to annular ring 74 but is blocked from rotating in opening direction 90.

To open chuck 10, and referring particularly to FIG. 3B, sleeve 18, and therefore nut 28, are rotated in direction 90 opposite to direction 88. Because pawls 78 and ratchet teeth 83 constrain annular ratchet 80 in the opening direction, ring 80 initially does not move, and tabs 84 therefore move through grooves 86. This slight rotation of nut 28 relative to chuck body 12 causes jaws 26 to retract slightly in passageways 38 and thereby releases the axially rearward force that frictionally retains annular ring flange 76 between bearing washer 62 and thrust ring member 46. As a result, annular ring 74 is once again rotatable with respect to the body. As the user continues to rotate sleeve 18 in opening direction 90, tabs 84 abut the sides of grooves 86 so that sleeve 18 again drives annular ratchet 80 and annular ring 74.

Depending on the frictional engagement between sleeve 18 and ratchet ring 80, if sleeve 18 is thereafter rotated in the closing direction, tabs 84 may rotate through grooves 86 until the tabs abut the opposite sides of the grooves, and the chuck may then be operated in the closing direction as described above. In the presently illustrated embodiment, however, friction between sleeve 18 and ring 80 hold the sleeve and the ring together in the position shown in FIG. 3B as the sleeve is rotated in closing direction 88 (FIG. 3A) until the jaws close onto a tool shank. When this event stops rotation of ring 74, pawls 78 hold ratchet ring 80 in position until grooves 86 in the still-rotating sleeve 18 pass over tabs 84. When the following edges of grooves 86 engage tabs 84, the sleeve again drives ring 80, and the chuck operates as discussed above.

Figure 4:
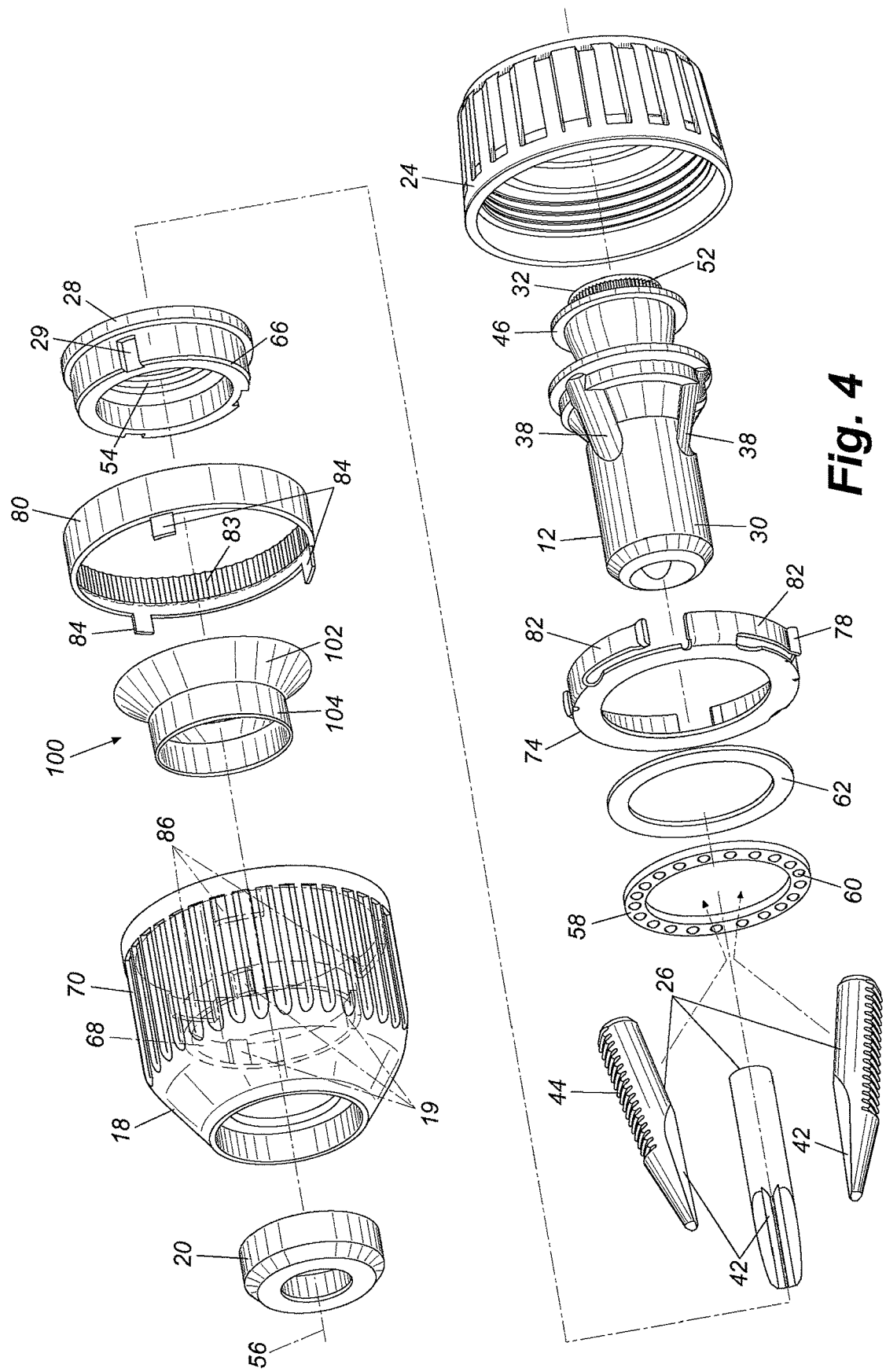
FIG. 4 is an exploded view of a chuck in accordance with an embodiment of the present invention.

In the embodiment illustrated in FIG. 4, chuck body 12 has been modified to receive a one piece nut 28. Forward portion 30 of chuck body 12 has been narrowed to allow the one-piece nut to slip over the forward body section into operative engagement with jaws 26 and thrust ring 46. That is, in assembling the chuck of FIGS. 4 and 5, annular ring 74, bearing washer 62 and bearing retainer 58 are slipped onto chuck body 12 adjacent to thrust ring 46. Next, jaws 26 are placed into respective passageways 38, and one-piece nut 28 is placed into abutment with bearings 60, so that the nut threads are in meshing engagement with the jaw threads.

A nut retainer 100 is received over forward body portion 30 in abutment with nut 28 to retain the nut in the axially forward direction. Nut retainer 100 includes a first generally cylindrical portion 102 that is press-fit onto the body and a second frusto-conical portion 104 that engages the nut while providing clearance for the jaws forward of the nut. Annular ratchet 80 is received about annular ring 74 so that pawls 78 engage teeth 83. Front sleeve 18 is then loosely fitted over forward body section 30. Drive ribs 19 (shown in phantom) formed on the inner circumference of front sleeve 18 engage drive slots 29 of nut 28, and annular ratchet tabs 84 are received in grooves 86 so that front sleeve 18, nut 28 and toothed ring 80 operate as described above.

A nose piece 20 is dimensioned and adapted to be press fitted onto the front of forward body section 30 to maintain front sleeve 18 on chuck 10. It should be appreciated that nose piece 20 could also be secured by snap fit, threading, or the like. Nose piece 20 is exposed when the chuck is assembled and is preferably coated with a non-ferrous metallic coating to prevent rust and to enhance its appearance. In a preferred embodiment, such coating may be zinc or nickel; however, it should be appreciated that any suitable coating could be utilized.

Nose piece 20 serves to maintain front sleeve 18 in position on chuck body 10 and in driving engagement with nut 28. In addition, nose piece 20 serves the dual purpose of providing an aesthetically pleasing cover for the nose portion that inhibits rust. This provides the advantage of an aesthetically pleasing appearance without the necessity to coat the entire chuck body 12 with a non-ferrous material.

Figure 5:
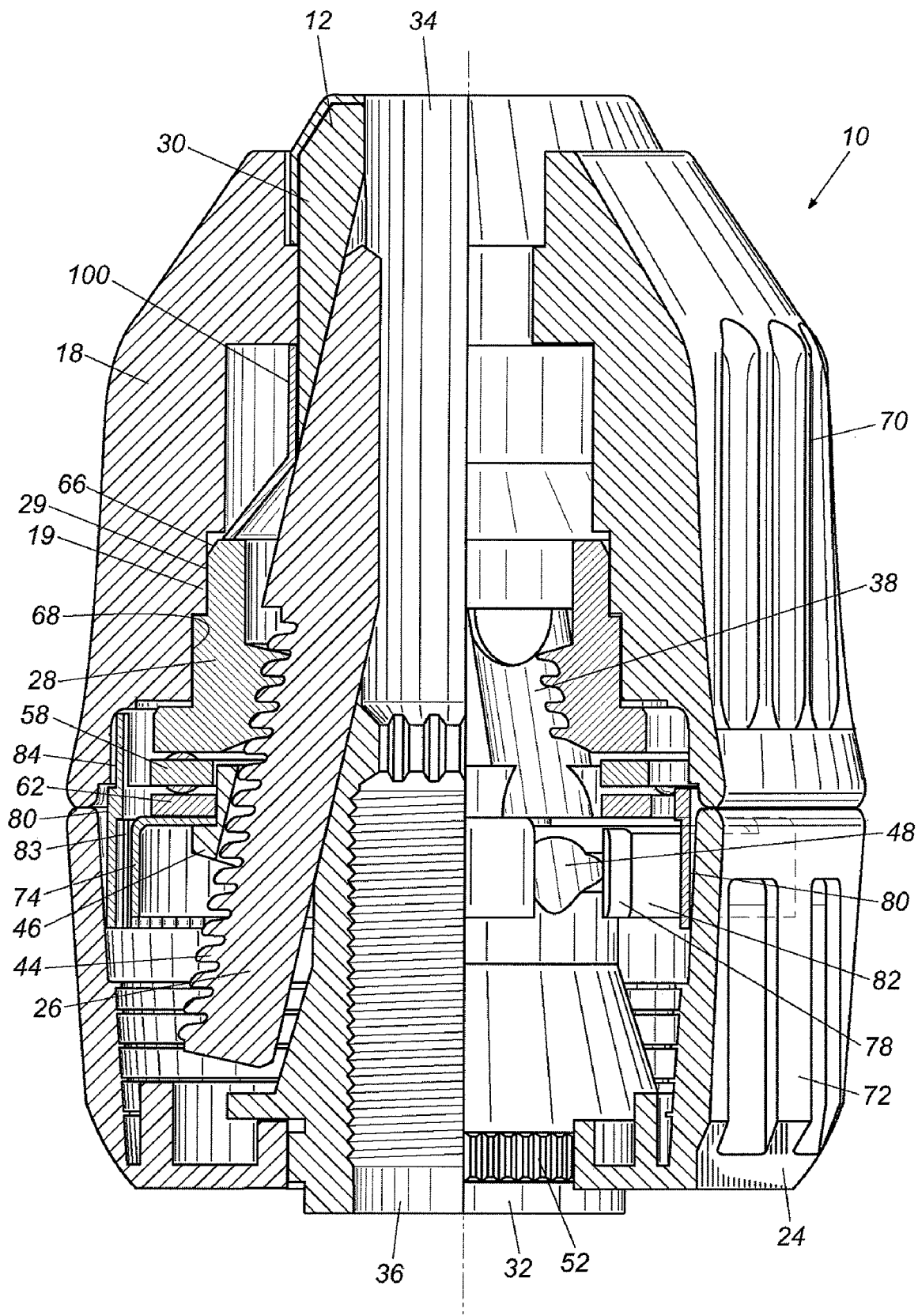
FIG. 5 is a longitudinal view, in cross section, of the chuck shown in FIG. 4.

The chuck of FIGS. 4 and 5 operates substantially the same as the embodiment of FIGS. 1 to 3. Therefore, a discussion of the operation of the chuck and tightening indicator will not be repeated.

Figure 6:
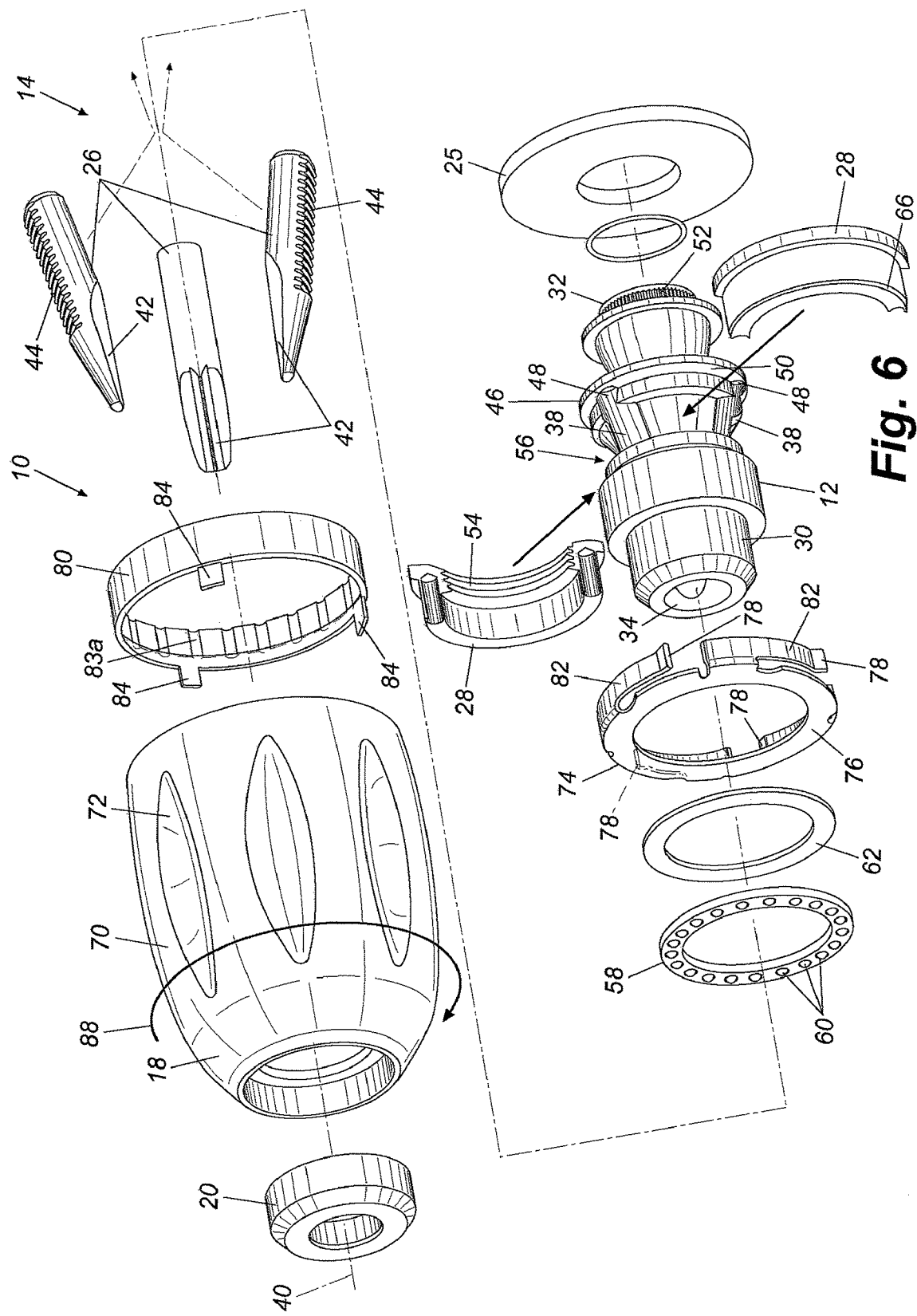
FIG. 6 is an exploded view of a chuck in accordance with an embodiment of the present invention.
Figure 7:
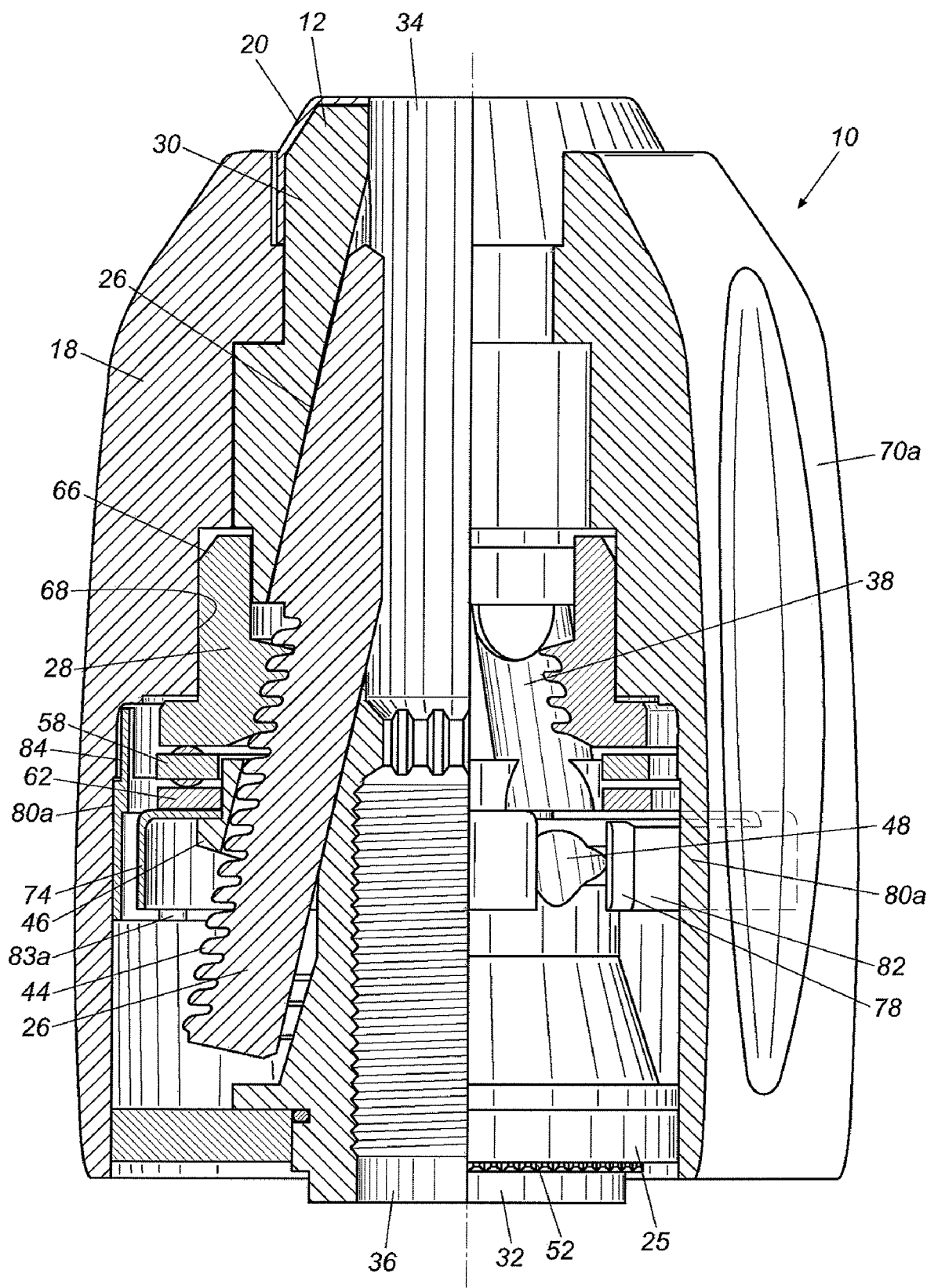
FIG. 7 is a longitudinal view, in cross section, of the chuck shown in FIG. 6.
Figure 8A:
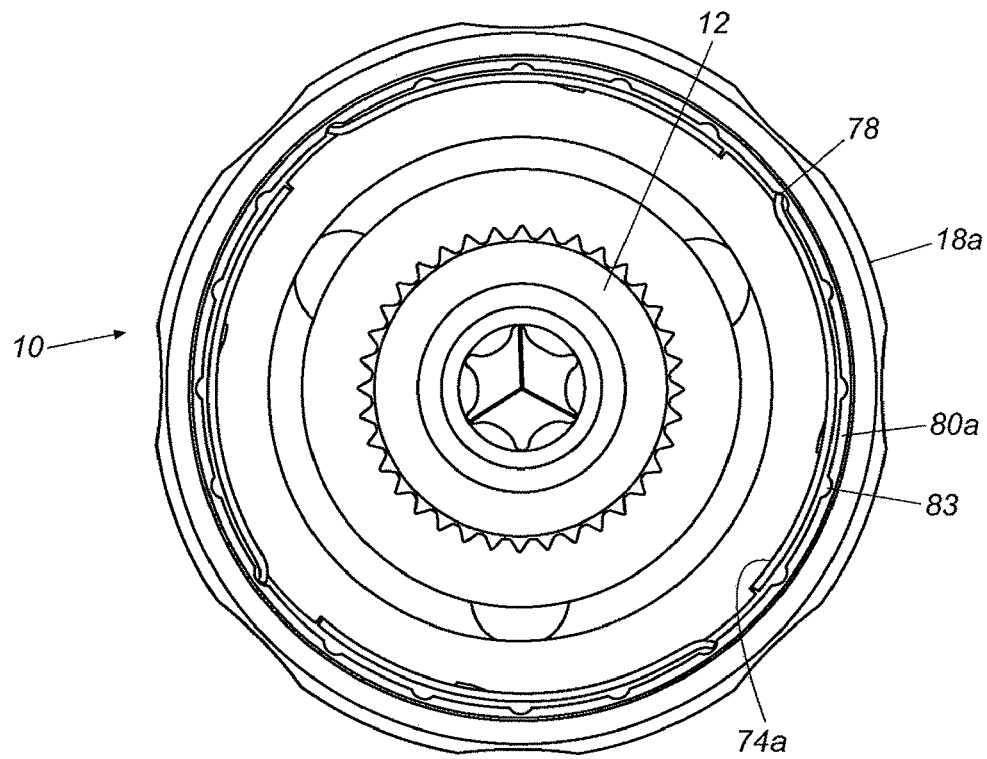
FIGS. 8A and 8B are bottom plan views of a chuck in accordance with an embodiment of the present invention.
Figure 8B:
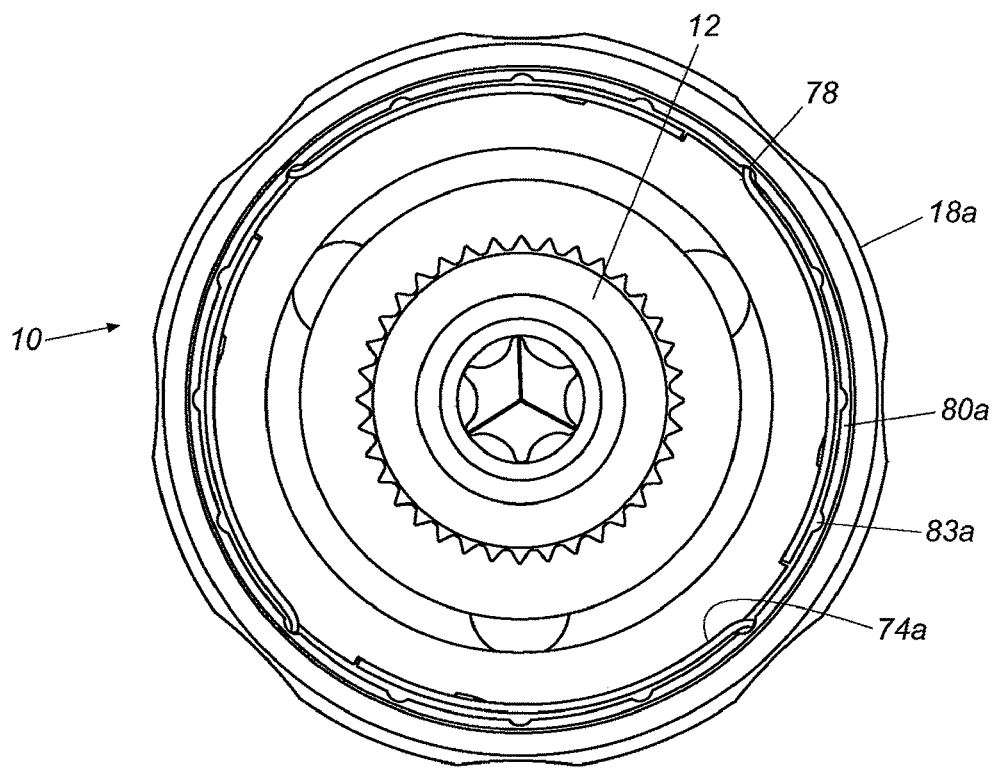

FIGS. 6 and 7 illustrate an embodiment of a chuck 10 having a sleeve 18a and an alternate tightening torque indicator. Parts of chuck 10 that have been changed from the previous embodiments have been assigned numerical labels ending with an "a". Chucks having a single sleeve are generally used with drivers having a spindle lock so that the spindle can be rotationally fixed to the driver while the sleeve is rotated in the opening or closing direction. Spindle locks should be well understood in the art. Spindle locks do not form a part of the present invention and are not discussed in further detail herein. It should be understood, however, that the chuck of the embodiment shown in FIGS. 6-9 would generally be used with a power driver having a spindle lock.

Chuck 10 has a body 12, a gripping mechanism, generally 14, sleeve 18a, a nose piece 20, a rear disc 25 and a nut 28. Gripping mechanism 14 includes a plurality of jaws 26. Body 12 is generally cylindrical in shape and comprises a nose or forward section 30 and a tail or rearward section 32. An axial bore 34 formed in forward section 30 is dimensioned somewhat larger than the largest tool shank that chuck 10 is designed to accommodate. A threaded bore 36 (FIG. 7) is formed in tail section 32 and is of a standard size to mate with a drive shaft of a powered or hand driver, for example a power drill having a spindle. The bores 34 and 36 may communicate at a central region of body 12. While a threaded bore 36 is illustrated, such bore is interchangeable with a tapered bore of a standard size to mate with a tapered drive shaft. Furthermore, body 12 may be formed integrally with the drive shaft.

Body 12 defines three passageways 38 that accommodate jaws 26. Each jaw is separated from each adjacent jaw by an arc of approximately 120 degrees. The axes of passageways 38 and jaws 26 are angled with respect to the chuck center axis 40 such that each passageway axis travels through axial bore 34 and intersects axis 40 at a common point. Each jaw 26 has a tool engaging face 42 generally parallel to chuck axis 40 and threads 44 formed on the jaw's opposite or outer surface that may be constructed in any suitable type and pitch.

Body 12 includes a thrust ring member 46 which, in a preferred embodiment, may be integral with body 12. In an alternative embodiment, thrust ring member 46 may be a separate component from body 12 that is axially and rotationally fixed to the chuck body by interlocking tabs, press fitting or other suitable connection means. Thrust ring member 46 includes a plurality of jaw guideways 48 formed around its circumference to permit retraction of jaws 26 therethrough and also includes a ledge portion 50 to receive a bearing assembly as described below.

Body tail section 32 includes a knurled surface 52 that receives rear disc 25 in a press fit fashion. Rear disc 25 could also be retained through a press fit without knurling, by use of a key or by crimping, staking, riveting, threading or any other suitable method of securing the disc to the body.

Nut 28, which in the preferred embodiment is a split nut, defines female threads 54 located on an inner circumference of the nut and is received in a groove 56 formed in chuck body 12 proximate thrust ring member 46. A bearing washer 62 and an annular bearing cage 58 are received between thrust ring 46 and nut 28. Bearing cage 58 holds a plurality of balls 60 that permits the nut to rotate relative to the chuck body.

Nut 28 is shown in FIG. 6 without serrations or knurling on its outer circumference. However, it should be understood that nut 28 may be formed with axially-aligned teeth, or other forms of knurling, on its outer circumference, and its outer edges may be provided with a small chamfer 66 to facilitate press fitting of the nut into a bore 68 of sleeve 18a. Preferably, the sleeve is molded or otherwise fabricated from a structural plastic such as a polycarbonate, a filled polypropylene, e.g., glass-filled polypropylene, or a blend of structural plastic materials. Other composite materials such as graphite filled polymerics may also be suitable in certain environments. As should be appreciated by one skilled in the art, the materials from which the chuck of the present invention is fabricated will depend on the end use of the chuck, and the above materials are provided by way of example only.

An outer circumferential surface of sleeve 18a may be knurled or may be provided with longitudinal recesses 72 or other protrusions 70 to enable the operator to grip it securely. Sleeve 18a is press fit to nut 28 to rotationally and axially secure the sleeve to the nut. The press fitting of nose piece 20 to body nose section 30 also helps to retain sleeve 18a against forward axial movement. Nose piece 20 may be coated with a non-ferrous metallic coating to prevent rust and to enhance its appearance. Examples of suitable coatings include zinc or nickel, although it should be appreciated that any suitable coating could be utilized.

Because sleeve 18a is rotationally fixed to nut 28, the sleeve's rotation with respect to body 12 also rotates nut 28 with respect to the body, which moves jaws 26 axially within passageways 38 due to the engagement of jaw threads 44 and nut threads 54. The direction of axial movement of jaws 26 depends on the rotational direction of sleeve 18a and nut 28 with respect to body 12. If a tool, such as a drill bit, is inserted into bore 34, the sleeve and nut may be rotated about chuck axis 40 in a closing direction 88 (FIG. 6) so that jaws 26 move to a closed position wherein jaw tool engaging surfaces 42 grippingly engage the tool. Rotation of sleeve 18a and nut 28 about axis 40 in the opposite or opening direction moves the jaws axially rearward out of the closed position to an open position as illustrated in FIG. 7.

Chuck 10 includes a tightening torque indicator comprising an annular ring 74a and an annular ratchet 80a. Annular ring 74a defines an inwardly extending flange 76 and has four pawls 78 that are connected to the ring via spring tabs 82. Spring tabs 82 bias the pawls radially outward from chuck axis 40 into engagement with annular ratchet 80a. Annular ratchet 80a defines forwardly extending tabs 84 and a plurality of recessed grooves 83a formed on an inner circumference of the main ratchet band. It should be understood that the chuck of the present embodiment can function with at least one pawl, but the optimum audible click is achieved with between preferably three or four pawls depending on the number of grooves 83a. That is, the number of grooves is preferably an equal multiple of the number of pawls so that each pawl simultaneously engages a corresponding groove.

As described in more detail below, and similarly to the embodiments described above, ring 74a can rotate with respect to ratchet 80a when the chuck jaws tighten onto a tool. As also similar to the above embodiments, such relative rotation between the ring and the ratchet produces an audible "clicking" sound as pawls 78 move from one set of grooves 83a to a succeeding set. In the present embodiment, however, grooves 83a are spread apart from each other so that the first such audible indicator occurs at a point at which a gripping torque applied by the jaws to the tool has been achieved that is sufficient to secure the tool in the chuck for expected normal operation without slipping of the tool in the jaws. Thus, the first clicking sound following the jaws' engagement of the tool notifies the user that the desired tightening torque has been achieved and that the user may therefore stop tightening the chuck. Of course, the level of desired gripping torque might vary among different circumstances. Once the desired grip torque is defined, however, the degree to which the sleeve should be rotated to achieve the desired grip torque, and therefore the angular spacing between the adjacent grooves 83a needed to provide the first audible click at the desired grip torque, depends upon the chuck's design and construction.

Generally, for a given chuck design and construction, there exists a linear relationship between input torque applied to the sleeve and nut after the jaws grip a tool and grip torque applied by the jaws to the tool. Thus, a given input torque can be expected to result in a predictable grip force. The tables below provide test results showing measured input torque and resulting output torque.

| Test Results of Input Torque and Corresponding Output Torque | | | | | |
|---|---|---|---|---|---|
| | Chuck Number 1 | | Chuck Number 2 | | Chuck Number 3 | |
| Measurement | Input Torque (lbs-in) | Output Torque (lbs-in) | Input Torque (lbs-in) | Output Torque (lbs-in) | Input Torque (lbs-in) | Output Torque (lbs-in) |
| 1 | 29 | 42 | 20 | 32 | 40 | 50 |
| 2 | 32 | 46 | 22 | 40 | 38 | 53 |
| 3 | 29 | 42 | 21 | 38 | 40 | 54 |
| 4 | 31 | 47 | 20 | 36 | 35 | 51 |
| 5 | 30 | 45 | 20 | 38 | 35 | 53 |
| 6 | 29 | 40 | 21 | 35 | 38 | 56 |
| 7 | 29 | 39 | 20 | 33 | 38 | 55 |
| 8 | 32 | 44 | 20 | 36 | 34 | 54 |
| 9 | 32 | 48 | 20 | 36 | 35 | 55 |

-continued

Test Results of Input Torque and Corresponding Output Torque

| Measurement | Chuck Number 1 | | Chuck Number 2 | | Chuck Number 3 | |
| --- | --- | --- | --- | --- | --- | --- |
| | Input Torque (lbs-in) | Output Torque (lbs-in) | Input Torque (lbs-in) | Output Torque (lbs-in) | Input Torque (lbs-in) | Output Torque (lbs-in) |
| 10 | 31 | 44 | 20 | 38 | 35 | 51 |
| Avg. | 30.4 | 43.7 | 20.4 | 32.7 | 36.8 | 53.2 |

As shown above, the output gripping force of a chuck is generally proportional to the torque exerted on the nut through the sleeve as the sleeve is rotated in the closing direction once the jaws contact the tool shank. The proportional relationship between input torque and grip force for a given chuck depends upon design and construction factors, including but not limited to the thread pitch of the jaws and the nut, lubrication between the chuck's moving parts, finishes on the surfaces of the moving parts, the bearing system employed, the area of contact between abutting surfaces that move relative to each other, and the angle of the jaw passageways relative to the central axis of the body. Consequently, varying one or more of the above chuck characteristics can result in an increase or decrease in the ratio of input torque to output gripping force.

Thus, where the relationship between input torque and output grip force is known for a given chuck arrangement, the desired angular spacing between grooves 83a can be determined by measuring the rotation of the sleeve and nut needed to achieve an input torque that corresponds to the desired grip force. For example, with a tool shank placed in axial bore 34, sleeve 18a may be rotated until the jaws engage the shank and the nut stops rotating relative to chuck body 12. A torque wrench is then attached to sleeve 18a, and the sleeve is rotated by the torque wrench in the closing direction until the input on the torque wrench reads approximately the target input torque. The angle between the torque wrench starting point and ending point is equal to the angular rotation the sleeve and nut must rotate to produce the required input torque to result in the desired output gripping force. For the chuck embodiment illustrated in FIGS. 6-7, the angular rotation is approximately 30 degrees (FIG. 7). The last step is to determine the number of times the measured angle divides into 360 degrees. In the present example, 30 degrees goes into 360 degrees twelve times. Thus, annular ratchet 80a is formed with twelve recessed grooves 83a equally spaced about the inner circumference of the ratchet.

Of course, it is possible, and in fact likely, that the measured angle will not divide into 360 degrees by a whole number. In that event, the number of grooves is preferably at most the next lowest whole number. For example, assume that the angle measured by the torque wrench to achieve the desired grip is 25 degrees. Twenty five degrees divides into 360 degrees 14.4 times. At most, 14 grooves should preferably be provided in the sleeve. Fourteen grooves provide the spacing closest to that which corresponds to the desired input torque and gripping force. More than 14 evenly distributed grooves would result in a first click prior to the point at which the desired input and grip torque are achieved. Fewer than 14 evenly-spaced grooves would result in the user applying more torque than necessary to achieve the minimum desired grip torque, but such arrangements may be desirable. For example, the number of grooves 83a should be a whole multiple of the number of pawls 78 so that all pawls simultaneously engage respective grooves. Thus, assume in the above example that it is desired to have four pawls. Four does not divide evenly into 14, and the number of grooves would preferably be adjusted downward to 12 grooves, the first whole multiple of four that is less then 14. Thus, referring to FIG. 8A, chuck 10 has 20 equally spaced grooves. Thus, the chuck required no more than 18 degrees of angular rotation to result in 20 equally spaced recessed grooves on ratchet 80a. The chuck shown in FIG. 8B has 16 equally spaced grooves. Thus, the chuck required no more than 22.5 degrees of angular rotation to result in 16 equally spaced recessed grooves on ratchet 80a.

Annular ring 74a is received on chuck body 12 intermediate bearing washer 62 and thrust ring 46. Annular ratchet 80a is received about annular ring 74a and nut 28 so that grooves (not shown) formed on the inner circumference of sleeve 18a receives respective tabs 84. The width of the grooves is larger than the width of tabs 84 so that sleeve 18a is rotatable over a limited angular distance relative to annular ratchet 80a.

Figure 9A:
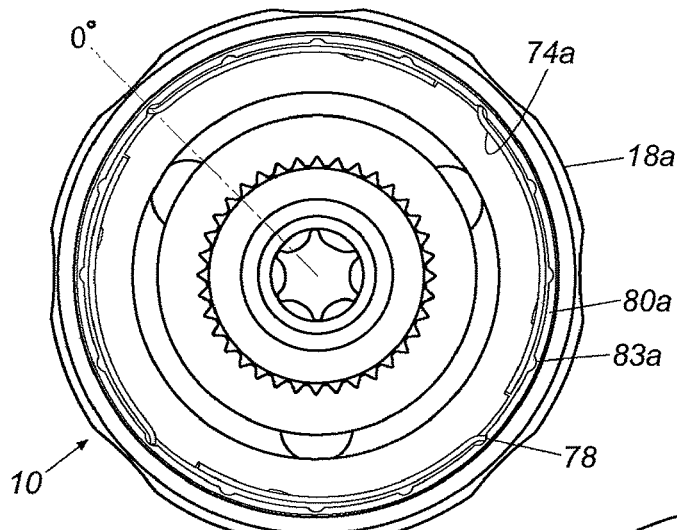
FIGS. 9A-9C are bottom plan views of the chuck shown in FIG. 6.

To close the chuck from an open condition, and referring to FIGS. 7 and 9A-9C, nut 28 is rotated via sleeve 18a in closing direction 88 so that jaws 26 are threadedly moved axially forward within the jaw passageways. Because tabs 84 sit against the driving edges of the sleeve grooves, annular ratchet 80a rotates in conjunction with sleeve 18a. Annular ring 74a also rotates with sleeve 18a since pawls 78 rotationally fix annular ring 74a to annular ratchet 80a. Once jaws 26 clamp onto a tool shank, however, a corresponding axial force is increasingly exerted rearwardly through jaws 26 to nut 28. The rearward axial force is transmitted through nut 28 to chuck body 12, and in particular against thrust ring member 46. Because annular ring flange 76 is intermediate bearing washer 62 and thrust ring ledge 50, axial force is transmitted from nut 28 through annular ring flange 76 to thrust ring member 46. This increases frictional forces between annular ring flange 76, bearing washer 62 and thrust ring member 46 in a direction opposite to the direction that sleeve 18a and nut 28 are being rotated. Accordingly, the frictional forces restrain rotation of annular ring 74a with respect to body member 12 (FIG. 9A).

Figure 9B:
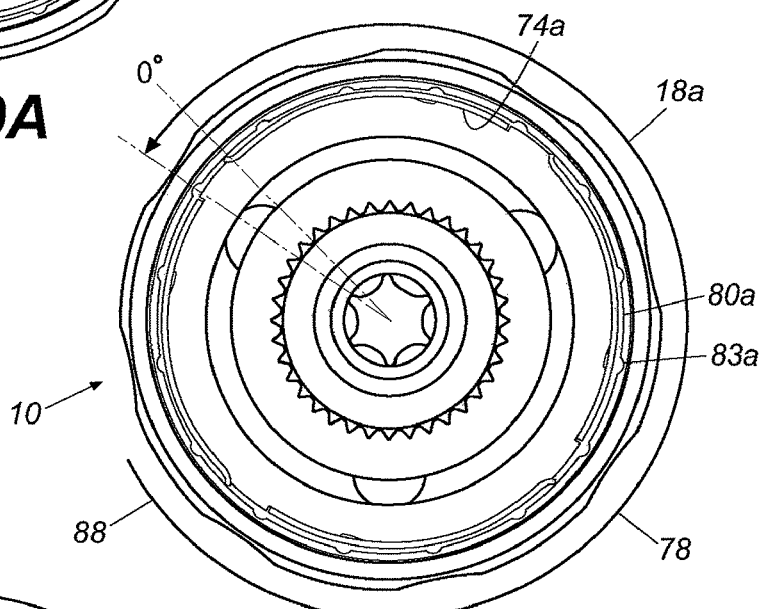
Figure 9C:
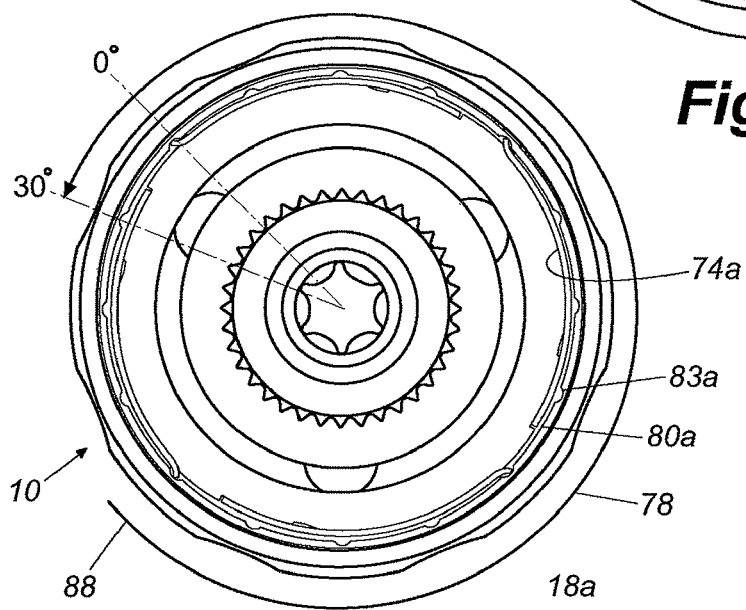

Referring to FIG. 9B, however, bearing 58 permits sleeve 18a and nut 28 to continue to rotate relative to chuck body 12 and annular ring 74a in the closing direction. Additionally, since pawls 78 are deflectable and are generally disposed in alignment with the shallow sloped walls of recessed grooves 83a, annular ratchet 80a continues to rotate with sleeve 18a relative to annular ring 74a. Thus, as annular ratchet 80 rotates the distal end of pawls 78 ride over the flat inner surface of annular ratchet 80a between adjacent recessed grooves. Referring to FIG. 9C, once the desired input torque has been applied to the sleeve/nut combination, each pawl 78 simultaneously enters a corresponding recessed groove 83a adjacent to the starting recessed groove, thereby producing an audible clicking sound indicating that the proper output gripping force has been achieved. That is, in the illustrated embodiment, in order for the audible click to occur, the sleeve/nut/annular ratchet combination must be rotated 30 degrees from the point where the jaws engaged the tool shank in order for the pawls to move from one recessed groove to the next adjacent groove.

To open chuck 10, and referring particularly to FIGS. 9A-9C, sleeve 18a, and therefore nut 28, are rotated in an opposite direction to direction 88. Because pawls 78 and recessed grooves 83a constrain annular ratchet 80a in the opening direction, ring 80a initially does not move, and tabs 84 therefore move through the sleeve grooves. This slight rotation of nut 28 relative to chuck body 12 causes jaws 26 to retract slightly in passageways 38 and thereby releases the axially rearward force that frictionally retains annular ring flange 76 between bearing washer 62 and thrust ring member 46. As a result, annular ring 74a is once again rotatable with respect to the body. As the user continues to rotate sleeve 18a in the opening direction, tabs 84 abut the sides of the sleeve grooves so that the sleeve again drives annular ratchet 80a and annular ring 74a.

If sleeve 18 is thereafter rotated in the closing direction, friction between sleeve 18 and ring 80 hold the sleeve and the ring together in the position they were in the opening direction until the jaws close onto a tool shank. When this event stops rotation of ring 74, pawls 78 hold ratchet ring 80 in position until grooves 86 in the still-rotating sleeve 18 pass over tabs 84. When the following edges of grooves 86 engage tabs 84, the sleeve again drives ring 80, and the chuck operates as discussed above.

It should be appreciated by those skilled in the art that various modifications and variations can be made in the present invention without departing from the scope and spirit of the invention. For example, the tightening torque indicator shown in FIGS. 6-8 can be employed in the dual sleeve shucks shown in FIGS. 1-5. It is intended that the present invention cover such modifications and variations as come within the scope and spirit of the appended claims and their equivalents.

What is claimed is:

1. A chuck for use with a manual or powered driver having a drive shaft, said chuck comprising:
   a. a generally cylindrical body having a nose section and a tail section, said tail section being configured to rotate with the drive shaft of the driver and said nose section having an axial bore formed therein;
   b. a plurality of jaws movably disposed with respect to said body in communication with said axial bore;
   c. a nut rotatably mounted about said body and in operative communication with said jaws so that rotation of said nut in a closing direction moves said jaws toward an axis of said axial bore and rotation of said nut in an opening direction moves said jaws away from said axis;
   d. a nut retainer member including a first portion and a second portion, said first portion being fixed to said body and said second portion being configured to engage said nut;
   e. a plurality of recesses, and
   f. at least one deflectable pawl biased toward and continuously engaging said plurality of recesses,
      wherein one of said plurality of recesses and said at least one deflectable pawl travel with said nut, and the other of said plurality of recesses and said at least one deflectable pawl travels:
         with said body when said chuck is in a first state in which said jaws are clamped on a shank of a tool thereby causing an audible click, and
         with said one of said plurality of recesses and said at least one deflectable pawl when said chuck is in a second state.

2. The chuck of claim 1, further comprising a first ring defining said recesses, wherein said first ring is rotatable with respect to said nut over a limited distance.

3. The chuck of claim 2, further comprising a second ring defining said at least one deflectable pawl, said second ring being disposed between said nut and said body.

4. The chuck of claim 3, wherein said body includes a thrust ring.

5. The chuck of claim 4, said chuck further comprising a bearing located intermediate said nut and said thrust ring.

6. The chuck of claim 5, said chuck further comprising a bearing washer located intermediate said bearing and said thrust ring.

7. The chuck of claim 6, wherein said second ring is intermediate said bearing washer and said thrust ring.

8. The chuck of claim 7, wherein when said chuck is in said first state, said nut imparts axially rearward force against said bearing thereby rotationally locking said second ring between said bearing washer and said body.

9. The chuck of claim 2, wherein said plurality of recesses is formed on an inner circumference of said first ring.

10. The chuck of claim 1, wherein when said chuck is in said first state, said nut is rotatable with respect to said body over a limited distance in said opening direction so that said jaws unclamp from the tool shank placing said chuck in said second state where said at least one deflectable pawl travels with said plurality of recesses.

11. The chuck of claim 1, wherein when said chuck is in said first state, said nut imparts axially rearward force against said body thereby rotationally locking said one of said plurality of recesses and said at least one deflectable pawl to said body.

12. The chuck of claim 1, further comprising at least one sleeve wherein said at least one sleeve is rotationally fixed to said nut.

13. The chuck of claim 1, wherein said nut retainer member is press fit to said body.

14. The chuck of claim 1, wherein said first portion of said nut retainer member is cylindrical and said second portion is frustoconically shaped.

15. A chuck for use with a manual or powered driver having a drive shaft, said chuck comprising:
   a. a generally cylindrical body having a nose section and a tail section, said tail section being configured to rotate with the drive shaft of the driver and said nose section having an axial bore formed therein;
   b. a plurality of jaws movably disposed with respect to said body in communication with said axial bore;
   c. a nut rotatably mounted about said body and in operative communication with said jaws so that rotation of said nut in a closing direction moves said jaws toward an axis of said axial bore and rotation of said nut in an opening direction moves said jaws away from said axis;
   d. a nut retainer member including a first portion and a second portion, said first portion being fixed to said body and said second portion being configured to engage said nut;
   e. a plurality of recesses, and
   f. at least one deflectable pawl biased toward and engaging said plurality of recesses,
      wherein one of said plurality of recesses and said at least one deflectable pawl travel with said nut, and the other of said plurality of recesses and said at least one deflectable pawl travels:
         with said body when said chuck is in a first state in which said jaws are clamped on a shank of a tool thereby causing an audible click, and
         with said one of said plurality of recesses and said at least one deflectable pawl about said body when said chuck is in a second state.

16. The chuck of claim 15, further comprising a first ring defining said recesses, and a second ring defining said at least one deflectable pawl.

17. The chuck of claim 16, wherein said plurality of recesses is formed on an inner circumference of said first ring.

18. The chuck of claim 15, wherein when said chuck is in said first state, said nut is rotatable with respect to said body over a limited distance in said opening direction so that said jaws unclamp from the tool shank placing said chuck in said second state where said at least one deflectable pawl travels with said plurality of recesses.

19. A chuck for use with a manual or powered driver having a drive shaft, said chuck comprising:
   a. a generally cylindrical body having a nose section and a tail section, said tail section being configured to rotate with the drive shaft of the driver and said nose section having an axial bore formed therein;
   b. a plurality of jaws movably disposed with respect to said body in communication with said axial bore;
   c. a nut rotatably mounted about said body and in operative communication with said jaws so that rotation of said nut in a closing direction moves said jaws toward an axis of said axial bore and rotation of said nut in an opening direction moves said jaws away from said axis;
   d. a nut retainer member including a first portion and a second portion, said first portion being fixed to said body and said second portion being configured to engage said nut;
   e. a plurality of recesses, and
   f. at least one deflectable pawl biased toward and continuously engaging said plurality of recesses,
      wherein one of said plurality of recesses and said at least one deflectable pawl travel with said nut, and the other of said plurality of recesses and said at least one deflectable pawl travels:
         with said body when said chuck is in a first state in which said jaws are clamped on a shank of a tool thereby causing an audible click,
         with said one of said plurality of recesses and said at least one deflectable pawl when said chuck is in a second state, and
      wherein when said chuck is in said first state, said nut is rotatable with respect to said body over a limited distance in said opening direction so that said jaws unclamp from the tool shank placing said chuck in said second state where said at least one deflectable pawl travels with said plurality of recesses.

20. The chuck of claim 19, further comprising a first ring defining said recesses, wherein said first ring is rotatable with respect to said nut over a limited distance.

* * * * *